US011669907B1

(12) United States Patent
Behrens et al.

(10) Patent No.: US 11,669,907 B1
(45) Date of Patent: Jun. 6, 2023

(54) METHODS AND APPARATUS TO PROCESS INSURANCE CLAIMS USING CLOUD COMPUTING

(71) Applicant: STATE FARM MUTUAL AUTOMOBILE INSURANCE COMPANY, Bloomington, IL (US)

(72) Inventors: Mercy Behrens, Bloomington, IL (US); Donald Joseph Yuhas, Bloomington, IL (US); Jason Beckman, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 295 days.

(21) Appl. No.: 16/455,533

(22) Filed: Jun. 27, 2019

(51) Int. Cl.
  *G06Q 40/08* (2012.01)
  *G06N 20/00* (2019.01)
  *H04L 67/10* (2022.01)
  *G06F 40/205* (2020.01)

(52) U.S. Cl.
  CPC ........... *G06Q 40/08* (2013.01); *G06F 40/205* (2020.01); *G06N 20/00* (2019.01); *H04L 67/10* (2013.01)

(58) Field of Classification Search
  CPC ...... G06Q 40/08; G06N 20/00; G06F 40/205; H04L 67/10
  USPC .......................................................... 705/2, 3
  See application file for complete search history.

(56) References Cited

U.S. PATENT DOCUMENTS

| | | | |
|---|---|---|---|
| 8,082,294 B2 | 12/2011 | Krahulec et al. | |
| 8,095,393 B2 | 1/2012 | Seifert et al. | |
| 9,886,841 B1 * | 2/2018 | Nave | G06F 30/20 |
| 9,947,202 B1 * | 4/2018 | Moon | G06Q 40/08 |
| 10,217,170 B2 * | 2/2019 | Edwards | G06Q 10/063116 |
| 10,453,145 B2 * | 10/2019 | Lawlor | G06Q 30/0283 |
| 10,484,542 B1 * | 11/2019 | Rager | H04M 3/42382 |
| 10,497,250 B1 * | 12/2019 | Hayward | G06Q 40/08 |
| 10,783,585 B1 | 9/2020 | Banerjee et al. | |
| 11,151,577 B2 * | 10/2021 | Chan | G06Q 10/06316 |

(Continued)

FOREIGN PATENT DOCUMENTS

WO    WO2009136795 A1    11/2009

OTHER PUBLICATIONS

Wikipedia, Cloud computing, Feb. 27, 2018, https://en.wikipedia.org/w/index.php?title=Cloud_computing&direction=next&oldid=826929965 (Year: 2018).*

(Continued)

*Primary Examiner* — Joshua B Blanchette
(74) *Attorney, Agent, or Firm* — Lee & Hayes, P.C.

(57) ABSTRACT

Example methods, apparatus and articles of manufacture to process insurance claims using cloud computing are disclosed herein. An example system to process an insurance claim using cloud computing includes an assistance resource of a cloud computing platform configured to interact electronically with at least one of an insured person, a representative of the insured person, or a representative of an insured entity to obtain information related to an insurance claim, an artificial intelligence resource of the cloud computing platform configured to process the information to identify an action to be taken for the insurance claim, and a backend system configured to perform the action, the backend processing module also useable by a person to manually process the insurance claim.

20 Claims, 3 Drawing Sheets

(56) References Cited

U.S. PATENT DOCUMENTS

| | | | |
|---|---|---|---|
| 2009/0240531 A1* | 9/2009 | Hilborn | G06Q 10/10 |
| | | | 705/4 |
| 2009/0287509 A1 | 11/2009 | Basak et al. | |
| 2010/0138243 A1* | 6/2010 | Carroll | G06Q 10/10 |
| | | | 705/4 |
| 2010/0145734 A1* | 6/2010 | Becerra | G06Q 10/087 |
| | | | 705/4 |
| 2012/0143634 A1 | 6/2012 | Beyda et al. | |
| 2012/0179496 A1 | 7/2012 | Wargin et al. | |
| 2012/0323827 A1 | 12/2012 | Lakshmanan et al. | |
| 2013/0124223 A1* | 5/2013 | Gregg | G16H 10/60 |
| | | | 705/3 |
| 2014/0081675 A1* | 3/2014 | Ives | G06Q 40/08 |
| | | | 705/4 |
| 2014/0324759 A1 | 10/2014 | Bonnard et al. | |
| 2015/0170288 A1 | 6/2015 | Harton et al. | |
| 2016/0063560 A1* | 3/2016 | Hameed | G06Q 30/0269 |
| | | | 705/14.61 |
| 2016/0117778 A1* | 4/2016 | Costello | G06Q 40/08 |
| | | | 705/4 |
| 2016/0140304 A1* | 5/2016 | Myers, Jr. | G06F 3/0482 |
| | | | 705/2 |
| 2016/0371785 A1 | 12/2016 | Bray | |
| 2017/0161372 A1* | 6/2017 | Fern | G06F 40/268 |
| 2017/0286607 A1 | 10/2017 | Magnuson et al. | |
| 2017/0352105 A1* | 12/2017 | Billings | G06Q 40/08 |
| 2019/0012094 A1* | 1/2019 | Li | G06F 12/10 |
| 2019/0012904 A1 | 1/2019 | Yusuf et al. | |
| 2019/0108915 A1* | 4/2019 | Spurlock, III | G16H 50/70 |
| 2019/0370369 A1* | 12/2019 | Kulkarni | G06F 16/9535 |
| 2020/0364797 A1* | 11/2020 | Halpern-Manners | |
| | | | G06Q 50/182 |

OTHER PUBLICATIONS

Wikipedia, Frontend and backend, May 23, 2018, https://en.wikipedia.org/w/index.php?title=Frontend_and_backend&oldid=842612738 (Year: 2018).*

Anand Rao, "A Strategist's Guide to Artificial Intelligence", stragey+business, Issue 87, Summer 2017 (Year: 2017).*

R. Singh, M. P. Ayyar, T. V. Sri Pavan, S. Gosain and R. R. Shah, "Automating Car Insurance Claims Using Deep Learning Techniques," 2019 IEEE Fifth International Conference on Multimedia Big Data (BigMM), Singapore, 2019, pp. 199-207, doi: 10.1109/BigMM.2019.00-25. (Year: 2019).*

"Enabling Integrated Claims Management," Cognizant 20-20 Insights Retrieved from https://www.cognizant.com/InsightsWhitepapers/Enabling-Integrated-Claims-Management.pdf, May 2012, 6 pages.

Mauri, "How an insurance claims web app can enhance your business," Mugo Web. Retrieved from https://www.mugo.ca/Blog/How-an-insurance-claims-web-app-can-enhance-your-business, Dec. 2017, 6 pages.

O'Connor, "Mobile Development Platform: The 4-Tier Architecture for Success," Progress.com. Retrieved from https://www.progress.com/blogs/mobile-development-platform-4-tier-architecture-for-success, Jan. 2017, 13 pages.

Non Final Office Action dated May 11, 2020 for U.S. Appl. No. 16/420,693 "Methods and Apparatus to Process Insurance Claims Using Artificial Intelligence" Behrens, 15 pages.

Office Action dated Oct. 2, 2020 for U.S. Appl. No. 16/420,693 "Methods and Apparatus to Process Insurance Claims Using Artificial Intelligence", Behrens, 18 pages.

Makadia, "How AI Enables Smarter Claims Processing & Fraud Detection?", towardsdatascience.com, May 2019, 10 pages.

Office Action for U.S. Appl. No. 16/420,693, dated Jan. 28, 2022, Behrens, "Methods and Apparatus to Process Insurance Claims Using Artificial Intelligence", 27 pages.

Office Action for U.S. Appl. No. 16/420,693, dated Jul. 25, 2022, Behrens, "Methods and Apparatus to Process Insurance Claims Using Artificial Intelligence", 12 pages.

* cited by examiner

METHODS AND APPARATUS TO PROCESS INSURANCE CLAIMS USING CLOUD COMPUTING

FIELD OF THE DISCLOSURE

This disclosure relates generally to insurance claim processing, and, more particularly, to methods, apparatus and articles of manufacture to process insurance claims using cloud computing.

BACKGROUND

Conventional insurance claims processing involves one or more human claim adjusters (e.g., processors, handlers, etc.) speaking with an insured person or entity about their insurance claim. Based on those conversations and submitted document(s), the claim adjuster(s) manually interacts with backend systems to process the insurance claim.

The figures depict embodiments of this disclosure for purposes of illustration only. One skilled in the art will readily recognize from the following discussion that alternate embodiments of the structures and methods illustrated herein may be employed without departing from the principles set forth herein.

In general, the same reference numbers will be used throughout the drawing(s) and accompanying written description to refer to the same or like parts. The figures are not to scale. Connecting lines or connectors shown in the various figures presented are intended to represent example functional relationships and/or physical or logical couplings between the various elements.

DETAILED DESCRIPTION

Manual insurance claim processing can be labor and time intensive, and costly to perform. For example, by relying on people to perform insurance claim processing, insurance companies need to employ large numbers of people to field claim inquiries and process claims. Further, insured persons can be frustrated by delays, and having to speak with multiple, different claim adjusters. Further still, because insured persons often have to speak with different claim adjusters, insured persons are often uncertain regarding the status of their claim. Moreover, many call centers are not open 24 hours a day, 7 days a week ("24/7"), making it difficult for some insured persons to reach an open call center. Even further, manual claim processing often does not take advantage of more flexible electronic communication methods such as chat, messaging, electronic mail, etc. that can enable an insured person to handle their claim on their schedule. Further, many claim processing systems are designed to take advantage of the flexibility, scalability, etc. inherent in cloud based computing.

Example methods, apparatus and articles of manufacture to process claims using cloud computing and artificial intelligence are disclosed herein that overcome some or all of the above challenges, and/or other challenges associated with manual claim processing. For example, disclosed examples can lead to exponential decreases in phone calls, and decreases in claim processing times. Customer interactions can better leverage digital engagements, electronic communications, etc. (e.g., chat, text messages, electronic mail (email), etc.) that allow insured persons to handle their claim, get questions answered, be educated, etc. 24/7 on their schedule and from any location, thereby, enabling the insured person to be in control of their claim, and to provide requested information. By using an AI claim handler (described below), dependence on call centers to manually submit, handle, and check on the status of claims is greatly reduced. Additionally, the AI claim handler handles most of the interactions with an insured person, thereby, reducing or eliminating claim adjuster handoffs, thereby decreasing frustration on the part of the insured person. Further, the AI claim handler can handle a claim from end-to-end (e.g., first-notice-of-loss (FNOL) to claim closed), is not dependent on calendars, and is not restricted to fixed rules and, thus, can be proactive. Accordingly, use of the AI claim handler enables time previously spent by human claim adjusters to handle mundane tasks to be reduced or eliminated, thereby freeing human claim adjusters to focus on decision making, complex information, escalation of an issue, customer engagement, sympathy, comfort, etc.

Some legacy claim processing systems are tightly coupled, complex and difficult to change, thereby restricting business agility. Thus, in disclosed examples, existing claim processing systems are implemented using more flexible interfaces and artificial intelligence using a cloud computing platform. In such examples, the cloud computing platform can evolve more quickly and dynamically without forcing changes in legacy claim processing systems and while also working with claim processing systems that have been ported to cloud computing. That is, the use of cloud computing enables claim processing systems to be flexible, adaptable, scalable, etc.

Reference will now be made in detail to non-limiting examples, some of which are illustrated in the accompanying drawings.

Figure 1:
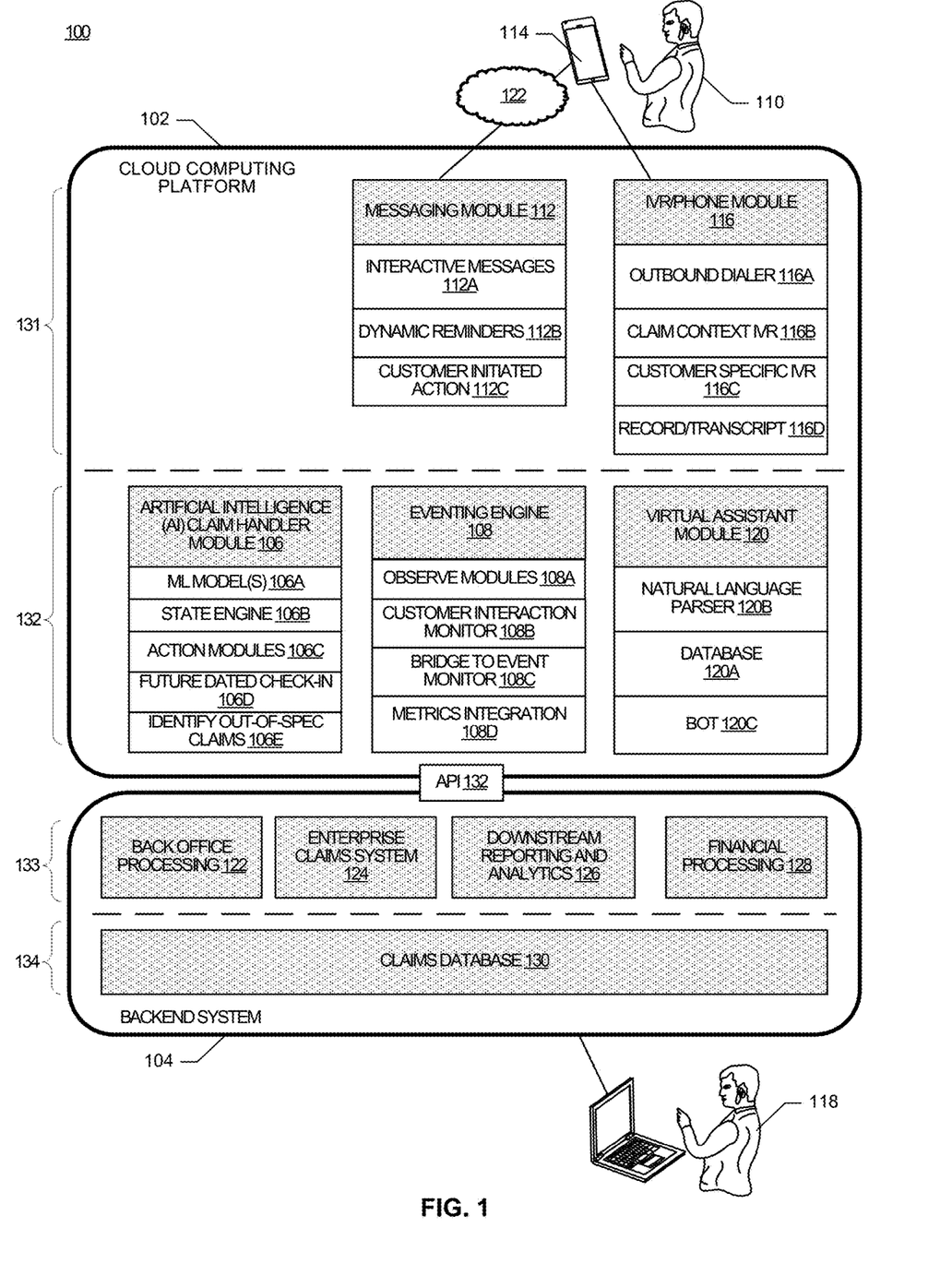
FIG. 1 is a block diagram of an example cloud computing based claim processing system to process insurance claims, in accordance with teachings of this disclosure.

FIG. 1 is a diagram of an example cloud computing based claim processing system 100 to, among possibly other things, process insurance claims using AI. To process insurance claims using AI, the example claim processing system 100 includes an example cloud computing platform 102 and an example backend system 104. The cloud computing platform 102 uses AI to take actions and make decisions to advance claim processing supported by humanlike interactions with insured persons with whom the cloud computing platform 102 is communicating in a manner with which the insured persons find natural. The example cloud computing platform may be implemented using Microsoft Azure, Amazon Web Services (AWS), Google Cloud Platform, etc.

The cloud computing platform 102 includes an example AI claim handler module 106, an example eventing engine 108, and any number or type(s) of communication interfaces to enable the AI claim handler module 106 to electronically interact with an insured person 110, entity, customer or, equivalently herein, a representative thereof. An example communication interface is an example messaging module 112 to interact with a device 114 (e.g., a tablet, a smartphone, a computer, etc.) associated with the insured person 110 via, for example, chat, electronic mail message, text messages, etc. Another example interface is an example interactive voice response (IVR)/phone module 116 to interact with the insured person 110 via a telephone (e.g., the device 114), an answering machine, etc.

The messaging module 112 of FIG. 1 includes an example interactive messaging module 112A to provide interactive messaging with the device 114, an example dynamic reminder module 112B to provide messages to the insured person 110 at a future particular time/day, and an example customer initiated action module 112C to respond to customer initiated communications. The IVR/phone module 116 of FIG. 1 includes an example outbound dialer 116A, an example IVR 116B specific to insurance claims, an example IVR 116C specific to a customer, and an example record/transcript 116D of calls.

The AI claim handler module 106 operates automatically (i.e., without human involvement) and proactively to process claims from a FNOL to claim resolution or closure. The AI claim handler module 106 applies artificial intelligence to proactively determine how/when to automatically and continuously monitor the state of a claim, determine when an action needs to be taken, and determine when it is necessary to interact with the insured person 110 to progress processing of the claim or provide timely, personalized status updates. As/when appropriate, the AI claim handler module 106 can escalate an issue to a human claim adjuster or operator 116. The AI claim handler module 106 can also involve the human claim adjuster or operator 116 when, for instance, an example virtual assistant module 120 determines that example, the insured person 110 is using words, expressions, tone of voice, etc. that may be indicative of frustration, confusion, anger, etc. For example, a decision may be needed that is outside the scope of the AI claim handler module 106, the AI claim handler module 106 may not have a sufficient decision confidence for a decision, etc.

Being based on machine learning, the AI claim handler module 106 is not tied to strict or defined rules, but can simultaneously consider all claim facts, past information, past actions, current information, current state, change of state, time passage, related business event, etc. and make a dynamic decision regarding what action(s) need to be taken. This ability to consider, at once, all the facts, information and consideration of an insurance claim is beyond the ability of human claim adjusters. In this way, the AI claim handler module 106 can move a claim forward even in the absence of activity, can anticipate a customer need, can initiate action rather than be beholden to a fixed timeline, use time based triggers, etc. By using machine learning, the AI claim handler module 106 can learn from multitudes (e.g., thousands or millions) of prior insurance claims the basics and nuances of claim processing, procedures, workflows, best practices, etc. Moreover, the AI claim handler module 106 provides personalized recommendations and tailors the insured's experience based on all available pertinent information for the insurance claim. In some examples, the AI claim handler module 106 includes one or more script-based decisions. In some examples, the AI claim handler module 106 could leverage (e.g., call) existing fixed, automated functions such as autopay. Additionally, or alternatively, the AI claim handler 106 can depart from one or more existing functions.

In some examples, during FNOL, the cloud computing platform 102, while the insured person 110 is at an accident scene, (a) educates the insured person 110 on the claim handling process, (b) works with the insured person 110 to capture relevant information, (c) initiates the capture of photos of the damage, (d) provides a message to start digital processing of the claim before engaging human adjusters, (e) determines if estimatic claim processing (e.g., automated damage estimation) is appropriate, (f) automates the obtaining of a rental car, etc.

In some examples, post FNOL (e.g., during claim processing), the cloud computing platform 102 (g) gathers and evaluates all claim information, recommends liability determination, and prompts associate decisions, (h) continuously engages the insured person 110 by providing reminders, (i) interacts with the insured person 110 through text messaging, chat or email to check status or get updates, (j) provides timely snapshots to the insured person 110 that include status updates and action items, (k) provides tailored guidance and just in time training to educate the customer and set expectations for next steps, (l) pushes the insured person toward self-service via chat, text messaging, email, etc. offers to reduce follow-up phone calls, (m) facilitates third party interactions through self-service portals for repair, rental and other insurance company (OIC) for claim updates, payment status or actions, (n) provides human claim adjusters with a single page view of a claim's key information and the ability to take action, (o) enables human claim adjusters to push messages in the moment to provide an enhanced customer experience, and (p) provides a contemporary and efficient workflow that alerts to potential breaches, highlights claims with high cycle time, and provides an overall view of interactions.

The cloud computing platform 102 can gather and evaluate all claim information, recommend liability determination, and prompt human claim adjuster decisions by, for example, reviewing all prior events, interactions, claim documentation, and any other information or activity on the claim as a basis for determining the current state of the claim, comparing the state of the claim to where the claim should be, and determining the next action needed on the claim to move it towards desired state or resolution. As an example, this could entail the cloud computing platform 102 observing that liability has not been established, ordering a police report, interrogating the police report to recommend a liability decision, presenting the recommendation via prompt to a human claim handler for evaluation and liability determination, and waiting for a trigger around established liability to re-evaluate claim and determine next steps.

The cloud computing platform 102 can provide timely snapshots to the insured person 110 that include status updates and action items by, for example, providing a summary of activities completed on the claim either by the insured person 110 or by the company, and providing a summary of tasks and next steps that are required or suggested. This includes providing relevant education or help messages to inform the customer on the claims process.

The cloud computing platform 102 can provide human claim adjusters 118 with a single page view of a claim's key information and the ability to take action by, for example, providing a summary view to the claim handler 118 highlighting prior activity on the claim, recent activity, and outstanding items needing human claim adjuster attention or action. For example, the summary may highlight that liability has been established, shop selection has been completed, an estimate has been received, EFT information from the customer is pending, interaction information details the customer has abandoned the EFT set up process mid-stream with a chat session started but not completed, and a rental offer was provided but a rental selection was not made In some examples, the AI claim handler module 106 includes one or more example machine learning (ML) modules 106A (e.g., a neural network, an Amazon Learning Machine, Amazon Pinpoint, Amazon Mobile Analytics, Salesforce Einstein, the Azure ML service, a gradient boosting machine, etc.) to determine next steps/actions/skills/etc. to perform based on the processing status of an insurance claim. In some examples, claim processing actions taken for previous claims are used to train or update the ML model(s) 106A. The ML model(s) 106A can be trained using unsupervised or supervised learning. In some examples, decisions made by the ML model(s) 106A are used to further train or update the ML model(s) 106A.

Additionally, or alternatively, the AI claim handler module 106 includes one or more example state engines 106B. The state engines 106B can be, for example, pre-programmed rules for processing all or part of insurance claims.

In some examples, an input of the ML model(s) 106A and the state engine 106B includes a vector of all data available for an insurance claim (e.g., dates, status, completions, information, insured person information, type of claim, etc.), and outputs of the ML model(s) 106A or the state engine 106B indicate which actions to carry out. The inputs and outputs for previously processed claims (e.g., manual or automatic) can be used to train the ML model(s) 106A using unsupervised or supervised learning. In this way, the ML model(s) 106A can learn new claim processing processes. In some examples, some actions are scripted. For example, a script copying all messages are stored in a record of the claim processing of an insurance claims.

The ML modules 106A and/or the state engines 106B trigger action modules 106C. Some action modules 106C select and initiate one or more other action modules 106C to implement dynamic reminders, engage with customers digitally, progress claims, re-evaluate claims, perform intelligent calendaring, perform smart estimating (e.g., determine when automated photo-based claim processing is appropriate), perform claim lifecycle management, etc. In some examples, a confidence level is determined for each action module selection that represents the likelihood the selection is the correct selection. If the confidence level is too low, the AI claim hander module 104 can route the insurance claim to the claim adjuster or operator 118 for review, and then the AI claim handler module 106 can resume processing the insurance claim.

In the illustrated example of FIG. 1, the AI claim handler module 106 includes an example future dated check-in module 106D to set reminders for a future time/date, and to notify the ML module(s) 106A and the state engine 106B when a future time/date has been reached, and an example identify out-of-specification claim module 106E to identify when an insurance claim has gone beyond pre-determined criteria (e.g., not processed in time, no action occurred, etc.). The AI claim handler module 106 may include additional, and/or alternative, modules than those shown in FIG. 1.

The example eventing engine 108 performs (e.g., carries out, executes, etc.) a plurality of example observe modules 108A. When an observe skill module 108A observes (e.g., detects, is triggered by, etc.) an event, information, etc., the observe module 108A notifies the AI claim handler module 106 of the event so the AI claim handler module 106 can take the appropriate action(s) in response to the observation. In some examples, the event engine 108 is implemented using Amazon SNS.

The observe modules 108A monitor information collected by, for example, an example customer interactions monitor module 108B, an example bridge-to-event monitor module 108C to monitor for inputs associated with the backend system 104, and an example metrics integration monitor module 108D to monitor metrics associated with the processing of claims. The eventing engine 108 may include additional, and/or alternative, modules than those shown in FIG. 1.

The action modules 106C, and the observe modules 108A can have metadata, can be searchable, can be selected from an inventory of modules, can be chained or sequenced together, can be composed of other modules, etc. Thus, through continual observing and acting using the example observe modules 108A and the example action modules 106C, the AI claim handler module 106 together with the eventing engine 108 can handle all aspects of an insurance claim. An example set of modules 106C, 108A that can be used to implement the AI claim handler 106 and the eventing engine 108 of FIG. 1 is disclosed in U.S. patent application Ser. No. 16/420,693, filed May 23, 2019, and entitled "Methods and Apparatus to Process Insurance Claims Using Artificial Intelligence," which is hereby incorporated herein in its entirety. U.S. patent application Ser. No. 16/420,693 is assigned to the assignee of this patent.

The messaging module 112 and the IVR/phone module 116 can communicate with the device 114, or other devices associated with the insured person 110 via any number or type(s) of communication network(s) 122. The communication network(s) 122 include, but are not limited to, the Internet, a local area network (LAN), a metropolitan area network (MAN), a wide area network (WAN), a landline telephone network, a voice over Internet protocol (VoIP) network, a wired network, a Wi-Fi network, a cellular network, a coaxial cable network, a wireless network, a private network, a virtual private network (VPN), a satellite network, etc.

The cloud computing platform 102 includes any number or type(s) of example virtual assistant modules, one of which is designated at the reference numeral 120, that enable the AI claim handler module 106 to interact with the insured person 110 as if the AI claim handler module 106 were an actual person, thereby delivering an engaging, human like, and personalized experience. In some examples, the virtual assistant module 120 is implemented using a bot, such as a conversation bot implemented using Amazon Lex. When the AI claim handler module 106 needs to communicate information to the insured person 110, the AI claim handler module 106 provides to the example virtual assistant module 120 the information to be conveyed, and the virtual assistant module 120 forms one or more messages (email, chat messages, text message, voice message, etc.) and conveys them via the communication network(s) 122. For example, reminder messages may be sent to remind an insured person that they still need to perform a task, a status message to inform the insured person that the state of their claim has changed, etc. Likewise, when the AI claim handler module 106 needs to obtain information from the insured person 110, the AI claim handler module 106 specifies to the virtual assistant module 120 the information to be obtained, and the virtual assistant module 120 forms one or more request messages (email, text message, voice message, etc.) and conveys them via the communication network(s) 122. When, one or more messages (email, chat messages, text message, voice message, etc.) are received from the insured person 110, the virtual assistant module 120 interprets the messages and conveys the content to the AI claim handler module 106. In some examples, the virtual assistant module 120 accesses a database 120A that stores example phrases, expressions, utterances, intents, etc. corresponding to types of messages to be sent or received. In some examples, the virtual assistant module 120 includes an example natural language parser (NLP) 120B using the database 120A to parse received messages into phrases, expressions, utterances, etc. that can be translated, for example, into intents of the insured person 110 for processing by the AI claim handler module 106.

In some examples, the virtual assistant module 120 enables, for example, repair facilities, human claim adjusters or operators, claimants, other parties, etc. to interact with, for example, the backend system 104. Such interactions may be instead of, or in addition to those used to interact directly with the backend system 104.

To provide information (e.g., help information), the example virtual assistant module 120 includes a bot 120C such as a chatbot, a frequency asked questions (FAQ) chatbot, etc. The bot 120C may be implemented, for example, as a cloud based bot, such as a conversation bot based on Amazon Lex.

Because the AI claim handler module 106, the eventing engine 108, the virtual assistant module 120, the messaging module 112, and the IVR/phone module 116 are available for use 24/7, the insured person 110 can interact 24/7 with the AI claim handler module 106 to process their insurance claim, have questions answered, receive information (e.g., educational), provide information, check status, etc. on their schedule, from any location, and using their preferred communication method(s). The AI claim handler module 106 is perceived by an insured as a sleepless claim processor that is the entity handling their insurance claim from start to finish, unless the claim needs to be escalated to a human claim adjuster for decision making, for complex claims, to provide empathy or compassion during a hard time, to handle a frustrated insured person, to help an insured person having difficulty using the AI claim handler module 106, etc.

In at least these ways, the AI claim handler module 106 and, more generally, the cloud computing platform 102 will be perceived as timely, personal and natural. And, together with the virtual assistant module 120, are more than a mere bot, as the AI claim handler module 106 can take actions based on the totality of the information for a claim, and progresses claim handling based on the same.

In some examples, the AI claim handler module 106 (and its associated functions 106A-106E) are implemented by an artificial intelligence resource of the cloud computing platform 102, the eventing engine 108 (and its associated features 108A-108D) are implemented by an eventing resource of the cloud computing platform 102, the messaging module 112 (and its associated features 112A-112C) are implemented by a communication resource of the cloud computing platform 102, the IVR/phone module 116 (and its associated functions 116A-116D) are implemented by communication resource(s) of the cloud computing platform 102, and the virtual assistant module 120 (and its associated functions 120A-120C) are implemented by an assistance resource of the cloud computing platform 102. However, fewer or more resources may be used depending on, for example, where insured persons are located, the resources needed for each function, etc. As used herein, the phrase "a function resource of a cloud computing platform" refers to a resource of the cloud computing platform that implements the "function." Broadly speaking, a resource of a cloud computing platform is processing capacity of one or more computing systems (e.g., a server) on which a cloud computing provider runs programs on behalf of a client.

The cloud computing platform 102 accesses the example backend system 104, such as an example back office processing module 122, an example enterprise claims system module 122, an example downstream reporting and analytics module 124, an example financial processing module 128, and an example claims database 130. In some examples, the backend system 104 are the same modules that the human claim adjuster 116 accesses to manually process claims. Accordingly, the backend system 104 can be reused by the cloud computing platform 102, and enable the same claim to be processed by the cloud computing platform 102 and the claim adjuster 116. Moreover, the same example application programming interface (API) 132 may be used by the cloud computing platform 102 and the claim adjuster 116 to access the backend system 104. In some examples, the API 132 is implemented using the Amazon API Gateway. In some examples, the backend system 104 is implemented by a legacy system, e.g., a system not implemented on a cloud computing platform such as the cloud computing platform 102. In some examples, the cloud computing platform 102 can interact with third party system(s) instead or, or in addition to, the backend system 104.

The back office processing module 122 handles manual claim handling activities, such as escalating claims to human claim adjusters or operators 116 for decision and validation. For example, the back office processing module 122 may recommend human manual decision for liability determination, "stuck" claim needing human intervention to resume, bot/virtual assistant escalation to human due to complex question or sentiment analysis trigger, such as an upset customer, etc.

The enterprise claims system module 124 handles claims processes and automation required to enable execution of a claim. This includes interfaces for capturing, updating, and changing information or actions within the claims lifecycle. Includes other policy lifecycle related solutions necessary to manage a customer across an insurance company for purchasing, billing, and customer management.

The downstream reporting and analytics module 124 provides solutions leveraged to analyze and report on all aspects of claims processes across customer interactions, operations, claim outcomes, etc. this includes accounting & reporting, operational reporting, analytical reporting, and loss history for underwriting/actuarial systems, or any other reporting, feeds, etc. that reflect on the status of a claim, or what decisions/payments were made on the claim, but are not essential to the direct handling of a given claim.

The financial processing module 128 handles financial reporting and tracking within an insurance/financial services organization. This includes issuing payments, recovery, and disputes (sub, arbitration, etc.), and might also handle financial processing for third party providers, such as consolidated payments to a repair facility.

The claims database 130 stores all the available information for each claim. The information may be stored using any number or type(s) of data structure(s). The claims database 128 may be stored on any number or type(s) of volatile or non-volatile non-transitory computer- or machine-readable storage medium or disk, such as a semiconductor memories, magnetically readable memories, optically readable memories, hard disk drive (HDD), an optical storage drive, a solid-state storage device, a solid-state drive (SSD), a read-only memory (ROM), a random-access memory (RAM), a compact disc (CD), a compact disc read-only memory (CD-ROM), a digital versatile disk (DVD), a Blu-ray disk, a cache, a flash memory, or any other storage device or storage disk in which information may be stored for any duration (e.g., permanently, for an extended time period, for a brief instance, for temporarily buffering, for caching of the information, etc.).

In the illustrated example of FIG. 1, the claim processing system 100 is implemented by four logical layers 131, 132, 133 and 134. In the first layer 131, the messaging module 112 and the IVR/phone module 116 handle the exchanging of information with the insured person 110. In the second layer 132, the AI claim handler module 106, the eventing engine 108 and the virtual assistant module 120 handle the processing of claims based on information exchanged by the first layer 132. The third layer 133 implements the backend modules 122, 124, 126 and 128 which update claims data stored in the database 130 in the fourth layer 134 based on interactions with the AI claim handler module 106, the eventing engine 108 and the virtual assistant module 120 of the second layer 132.

While the example cloud computing platform 102, the example backend system 104 and/or, more generally, the example claim processing system 100 are shown in FIG. 1, one or more of the elements, processes and devices illustrated in FIG. 1 may be combined, divided, re-arranged, omitted, eliminated or implemented in any other way. Further, the example cloud computing platform 102, the example backend system 104 and/or, more generally, the example claim processing system 100 may include one or more elements, processes or devices in addition to, or instead of, those illustrated in FIG. 1, or may include more than one of any or all of the illustrated elements, processes and devices.

Figure 2:
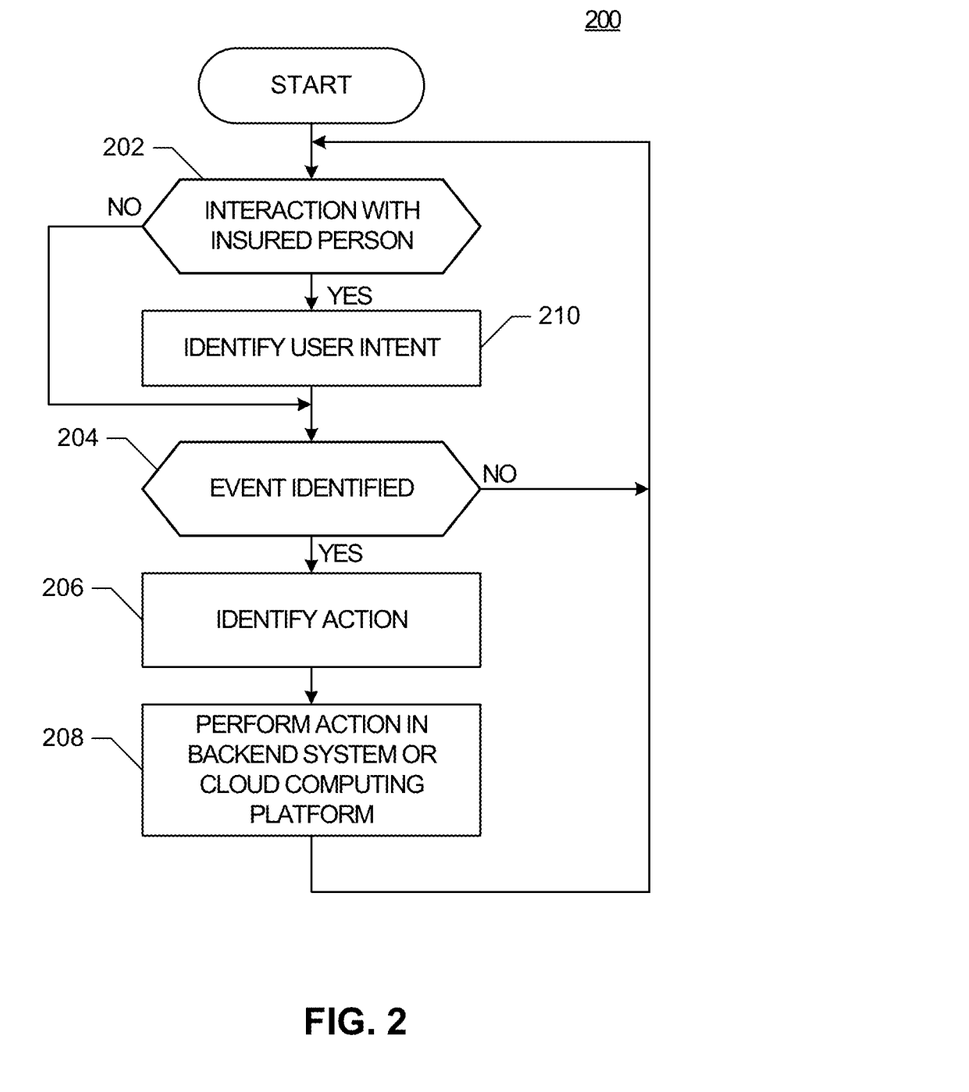
FIG. 2 is a flowchart representative of example method, hardware logic and instructions for implementing the claim processing system of FIG. 1, in accordance with the described embodiments.

FIG. 2 is an example flowchart 200 representative of example processes, methods, software, firmware, and computer- or machine-readable instructions for implementing the example cloud computing platform 102, the backend system 104 and/or, more generally, the example claim processing system 100 disclosed herein. The processes, methods, software and instructions may be an executable program or portion of an executable program for execution by one or more processors such as the processor 302 (see FIG. 3). The program may be embodied in software or instructions stored on a non-transitory computer- or machine-readable storage medium or disk 304 (see FIG. 3) associated with the processor 302. Further, although the example program is described with reference to the flowchart illustrated in FIG. 2, many other methods of implementing the example cloud computing platform 102, the backend system 104 and/or, more generally, the example claim processing system 100 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an application specific integrated circuit (ASIC), a programmable logic device (PLD), a field programmable gate array (FPGA), a field programmable logic device (FPLD), a logic circuit, etc.) structured to perform the corresponding operations without executing software or firmware. Of course, a combination of the two approaches could be used.

The example process of FIG. 2 begins with checking for an interaction with an insured person to occur (block 202). If no interaction has occurred, a determination by the eventing engine 108 is made whether another type of event has occurred (block 204). If another type of event has occurred (block 204), action(s) in response to the identified event is identified by, for example, the AI claim handler module 106 (block 206). The identified action(s) are performed in the backend system 104 or by the AI claim handler module 106 (block 208).

Returning to block 204, if no event has occurred either by the user or otherwise, control returns to block 202 to check for an interaction with the insured person.

Returning to block 202, if an interaction with the insured person has occurred (block 202), the virtual assistant module 120 identifies the person's intent based on the interaction (block 210). At block 204, the person's intent is used to determine whether there is an associated event.

Figure 3:
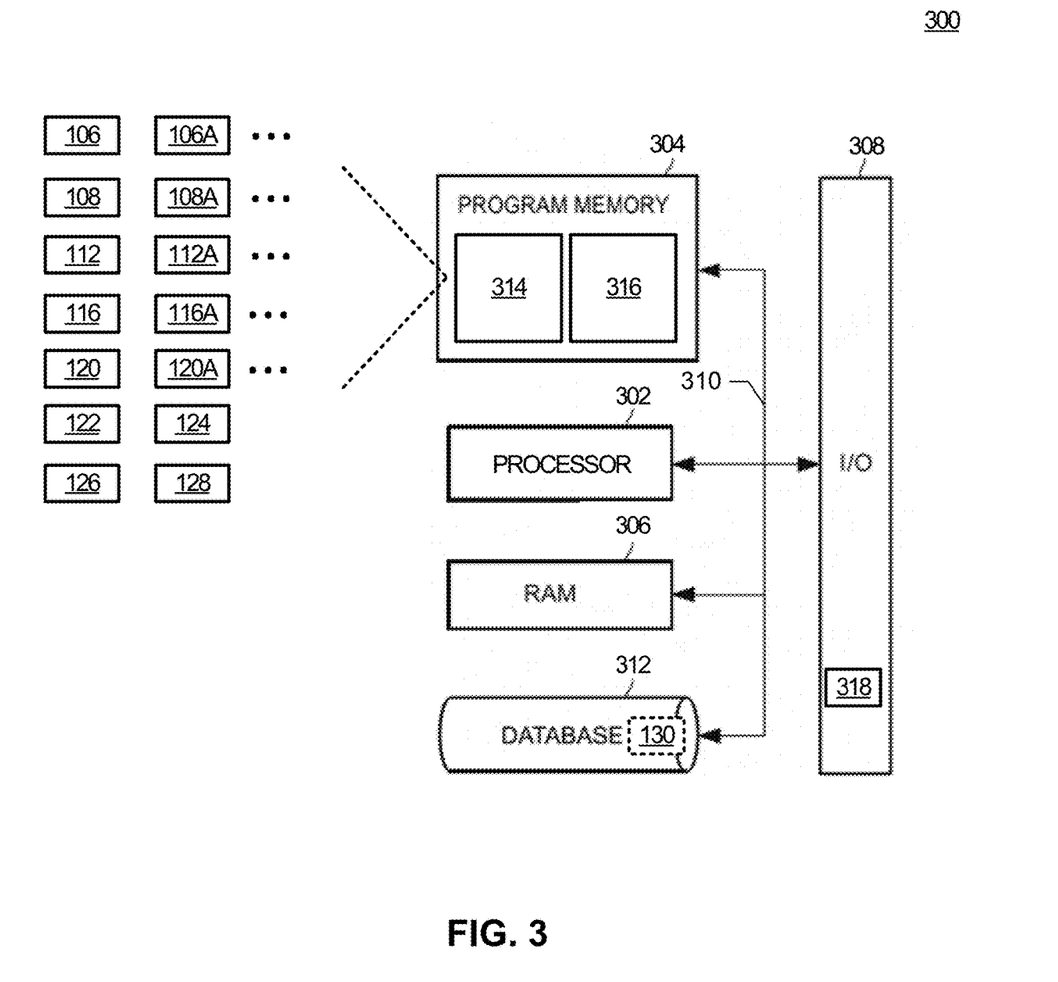
FIG. 3 is a block diagram of an example computing system that may be used to carry out the process of FIG. 2 and/or, more generally, implement the claim processing system of FIG. 1, in accordance with the described embodiments.

Referring now to FIG. 3, a block diagram of an example computing system 300 to process insurance claims using cloud based computing and artificial intelligence in accordance with described embodiments. The example computing system 300 may be used to, for example, implement all or part of the cloud computing platform 102, the backend system 104, and/or, more generally, the claim processing system 100.

The computing system 300 includes a processor 302, a program memory 304, a RAM 306, and an I/O circuit 308, all of which are interconnected via an address/data bus 310. The program memory 304 may store software, and machine- or computer-readable instructions, which may be executed by the processor 302.

It should be appreciated that although FIG. 3 depicts only one processor 302, the computing system 300 may include multiple processors 302. Moreover, different portions of the example claim processing system 100 may be implement by different computing systems such as the computing system 300. Example processors 302 include a programmable processor, a programmable controller, a graphics processing unit (GPU), a digital signal processor (DSP), an ASIC, a PLD, an FPGA, an FPLD, etc.

The program memory 304 may include memories, for example, one or more RAMs (e.g., a RAM 314) or one or more program memories (e.g., a ROM 316), or a cache (not shown) storing one or more corresponding software, and machine- or computer-instructions. For example, the program memory 304 stores software, and machine- or computer-readable instructions, or computer-executable instructions that may be executed by the processor 302 to implement the any of the modules, systems, etc. 106, 106A-E, 108, 108A-108D, 112, 112A-112C, 116, 116A-116D, 120, 120A-120C, 122, 124, 126, and 128 to processing insurance claims using artificial intelligence and cloud computing. Modules, systems, etc. instead of and/or in addition to those shown in FIG. 3 may be implemented. The software, machine-readable instructions, or computer-executable instructions may be stored on separate non-transitory computer- or machine-readable storage mediums or disks, or at different physical locations.

Example memories 304, 314, 316 include any number or type(s) of volatile or non-volatile non-transitory computer- or machine-readable storage medium or disk, such as a semiconductor memories, magnetically readable memories, optically readable memories, HDD, an optical storage drive, a solid-state storage device, a SSD, a ROM, a RAM, a CD, a CD-ROM, a DVD, a Blu-ray disk, a cache, a flash memory, or any other storage device or storage disk in which information may be stored for any duration (e.g., permanently, for an extended time period, for a brief instance, for temporarily buffering, for caching of the information, etc.).

As used herein, the term non-transitory computer-readable medium is expressly defined to include any type of computer-readable storage device and/or storage disk and to exclude propagating signals and to exclude transmission media. As used herein, the term non-transitory machine-readable medium is expressly defined to include any type of machine-readable storage device and/or storage disk and to exclude propagating signals and to exclude transmission media.

In some embodiments, the processor 302 may also include, or otherwise be communicatively connected to, a database 312 or other data storage mechanism (one or more hard disk drives, optical storage drives, solid state storage devices, CDs, CD-ROMs, DVDs, Blu-ray disks, etc.). In the illustrated example, the database 312 stores the database 130.

Although FIG. 3 depicts the I/O circuit 308 as a single block, the I/O circuit 308 may include a number of different types of I/O circuits or components that enable the processor 302 to communicate with peripheral I/O devices. The peripheral I/O devices may be any desired type of I/O device such as the messaging module 112, the IVR/phone module 116, a keyboard, a display (a liquid crystal display (LCD), a cathode ray tube (CRT) display, touch, etc.), a navigation device (a mouse, a trackball, a capacitive touch pad, a joystick, etc.), speaker, a microphone, a button, a communication interface, an antenna, etc.

The I/O circuit 308 may include a number of different network transceivers 318 that enable the computing system 300 to communicate with another computer system, such as the computing system 300 that implement other portions of the claim processing system 100 via, e.g., a network (e.g., the communication network 130). The network transceiver 318 may be a Wi-Fi transceiver, a Bluetooth transceiver, an infrared transceiver, a cellular transceiver, an Ethernet network transceiver, an asynchronous transfer mode (ATM) network transceiver, a digital subscriber line (DSL) modem, a cable modem, etc.

Example methods, apparatus, and articles of manufacture to process insurance claims using AI are disclosed herein. Further examples and combinations thereof include at least the following.

Example 1 is an example system to process an insurance claim using cloud computing includes an assistance resource of a cloud computing platform configured to interact electronically with at least one of an insured person, a representative of the insured person, or a representative of an insured entity to obtain information related to an insurance claim, an artificial intelligence resource of the cloud computing platform configured to process the information to identify an action to be taken for the insurance claim, and a backend system configured to perform the action, the backend processing module also useable by a person to manually process the insurance claim.

Example 2 is the system of example 1, further comprising a machine-readable storage disk or medium to store a claims database to store claims based data accessed by the backend system to perform the action.

Example 3 is the system of any of examples 1 and 2, further including a communicating resource of the cloud computing platform, wherein the communicating resource, the assistance resource together with the artificial intelligence resource, the backend system, and the claims database form four logical layers of a computing platform.

Example 4 is the system of any of examples 1 to 3, wherein the backend system is implemented separately from the cloud computing platform, and is accessed by the cloud computing platform via an application programming interface.

Example 5 is the system of any of examples 1 to 4, wherein the artificial intelligence resource includes machine learning trained using information from other insurance claims.

Example 6 is the system of any of examples 1 to 5, wherein the artificial intelligence resource includes a state engine.

Example 7 is the system of any of examples 1 to 6, wherein the artificial intelligence resource is to process the information to identify the action by processing previously obtained information related to the insurance claim.

Example 8 is the system of any of examples 1 to 7, further comprising:

an eventing resource of the cloud computing platform configured to identify an observed event; and a state engine resource of the cloud computing platform configured to identify the action based on the observed event.

Example 9 is the system of example 8, wherein the eventing resource is to identify the observed event based on at least one of the obtained information, or other information obtained from another resource of the cloud computing platform system.

Example 10 is the system of any of examples 1 to 9, wherein the artificial intelligence resource is configured to escalate the insurance claim to a human claim adjuster for at least one of a decision, sympathy, comfort, or complex information.

Example 11 is the system of any of examples 1 to 10, further including a communicating resource configured to interact with the at least one of the insured person, the representative of the insured person, or the representative of the insured entity using humanlike interactions.

Example 12 is the system of any of examples 1 to 11, further including a communicating resource configured to interact with the at least one of the insured person, the representative of the insured person, or the representative of the insured entity using at least one of a text message, a chat message, an electronic mail message, or an interactive voice response interaction.

Example 13 is the system of any of examples 1 to 12, wherein the assistance resource is configured to obtain the information using natural language parsing.

Example 14 is the system of any of examples 1 to 13, wherein the assistance resource of the cloud computing resource is configured to process the information to identify an intent of the insured person, the representative of the insured person, or the representative of an insured entity.

Example 15 is a method to process an insurance claim using a cloud computing platform including operating an assistant resource of a cloud computing platform to interact electronically with at least one of an insured person, a representative of the insured person, or a representative of an insured entity to object information related to an insurance claim, operating an artificial intelligence resource of the cloud computing platform to process the information to identify an action to be taken for the insurance claim, and interacting with a backend system configured to perform the action, the backend system also useable by a person to manually process the insurance claim.

Example 16 is the method of example 15, wherein the backend system is implemented separately from the cloud computing platform, and is accessed by the cloud computing platform via an application programming interface.

Example 17 is the method of any of examples 15 to 16, further including operating the artificial intelligence resource includes machine learning trained using information from other insurance claims.

Example 18 is the method of any of examples 15 to 17, wherein the assistant resource obtains the information using natural language parsing.

Example 19 is the method of any of examples 15 to 18, further including operating an eventing resource of the cloud computing platform identify an observed event, wherein the artificial intelligence resource is to identify the action based also on the observed event.

Example 20 is the method of any of examples 15 to 19, wherein the artificial intelligence resource is to escalate the insurance claim to a human claim adjuster for at least one of a decision, sympathy, comfort, or complex information Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

As used herein, the terms "comprises," "comprising," "includes," "including," "has," "having," "containing," or any other variation thereof, are intended to cover a non-exclusive inclusion. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

As used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Unless specifically stated otherwise, "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Further, in this document, relational terms such as first and second, top and bottom, and the like may be used solely to distinguish one entity or action from another entity or action without necessarily requiring or implying any actual such relationship or order between such entities or actions.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Finally, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to process an insurance claim using cloud computing, the system comprising:
   an assistance resource of a cloud computing platform, wherein the assistance resource is configured to:
      detect an event related to an insurance claim, the insurance claim being characterized by a particular claim type; and
      determine, based on detection of the event, a status of the insurance claim, wherein the status is indicative of a number of incomplete steps in processing the insurance claim;
   an artificial intelligence resource of the cloud computing platform, wherein the artificial intelligence resource is configured to:
      select, based on the claim type and from a plurality of machine learning models associated with respective claim types, a machine learning model configured to identify a next action to be taken in processing the insurance claim, wherein:
         the selected machine learning model comprises a model trained to analyze data of insurance claims characterized by the claim type, and
         the model is trained on training data comprising sequences of processing actions taken in previously-processed insurance claims of the claim type;
      determine, using the selected machine learning model, a processing action to be taken for the insurance claim based at least in part on the status of the insurance claim, the processing action being associated with at least one of the incomplete steps;

predict, based on detection of the event and for each skill module of a plurality of skill modules associated with a backend system, a confidence level indicative of an ability to perform the processing action without receiving manual input;

select, automatically and without receiving manual input, a skill module of the plurality of skill modules based on the predicted confidence levels; and provide an executable command, corresponding to the processing action, to the skill module, the command causing the skill module to:

perform the processing action; and update the status of the insurance claim based on completion of the processing action.

2. The system of claim 1, further comprising a machine-readable storage disk or medium storing a claims database of data associated with claims and accessible by the backend system.

3. The system of claim 1, further including a communicating resource of the cloud computing platform, wherein the communicating resource, the assistance resource together with the artificial intelligence resource, the backend system, and the claims database form four logical layers of a computing platform.

4. The system of claim 1, wherein the backend system is accessed by the cloud computing platform via an application programming interface.

5. The system of claim 1, wherein the artificial intelligence resource uses information from other insurance claims, wherein the information includes metrics associated with processing the other insurance claims.

6. The system of claim 1, wherein the artificial intelligence resource is further configured to:

determine, based on the status of the insurance claim, that pre-determined requirements associated with the insurance claim are not satisfied; and based on determining that the requirements are not satisfied, escalate the insurance claim to a human claim adjuster for decision making associated with the insurance claim.

7. The system of claim 1, wherein the assistance resource is configured to detect the event based on information obtained from a client device via at least one of a text message, a chat message, an electronic mail message, or an interactive voice response interaction.

8. The system of claim 7, wherein the assistance resource is configured to obtain the information using natural language parsing.

9. A method to process an insurance claim using a cloud computing platform, the method comprising:

detecting, by a cloud computing platform and based on input data from a client device, an event related to an insurance claim, the insurance claim being characterized by a particular claim type;

determining, based on detection of the event, a status of the insurance claim, wherein the status is indicative of a number of incomplete steps in processing the insurance claim;

executing a trained machine-learning component within the cloud computing platform, wherein the trained machine-learning component is:

selected based on the claim type and from a plurality of machine learning models associated with respective claim types, trained on training data comprising sequences of processing actions taken in previously-processed insurance claims of the claim type, and configured to determine a processing action associated with the insurance claim based at least in part on the status of the insurance claim, the processing action being associated with at least one of the incomplete steps;

predicting, based on detection of the event and for each skill module of a plurality of skill modules associated with a backend system, a confidence level indicative of an ability to perform the processing action without receiving manual input;

selecting, automatically and without receiving manual input, a skill module of the plurality of skill modules based on the predicted confidence levels; and transmitting, by the cloud computing platform and to a backend system with which the skill module is associated, an executable command corresponding to the processing action.

10. The system of claim 7, wherein an input to the artificial intelligence resource comprises a vector based at least in part on: the claim type and the information obtained from the client device.

11. The system of claim 1, wherein the artificial intelligence resource of the cloud computing platform trains the selected machine learning model using the training data and prior to the selecting, such that the trained machine learning model is used to determine the processing action.

12. The system of claim 7, wherein the artificial intelligence resource is configured to initiate an automated damage estimate associated with the insurance claim, based at least in part on (a) the claim type and (b) the information obtained from the client device.

13. The method of claim 9, wherein the trained machine-learning component is configured to output a liability determination based at least in part on (a) the determined claim type and (b) the input data received from the client device related to the insurance claim, and wherein the method further comprises training the machine-learning component using the training data.

14. The method of claim 9, wherein the status of the insurance claim is based at least in part on a comparison between a time threshold and an amount of time passed since a previous action was taken relating to the insurance claim, and wherein the backend system is further configured to:

based on determining that the amount of time passed exceeds the time threshold, provide a reminder to the client device.

15. The method of claim 9, wherein the trained machine-learning component is configured to initiate an automated damage estimate associated with the insurance claim, based at least in part on (a) the determined claim type and (b) the input data received from the client device related to the insurance claim.

16. The system of claim 3, wherein the communicating resource is configured to send information to a client device via at least one of a text message, a chat message, an electronic mail message, or an interactive voice response interaction.

17. The system of claim 1, wherein the status of the claim is based on pre-determined criteria including at least one of: a list of processing actions to be taken, documents to be received, or time deadlines for processing actions.

18. The system of claim 1, wherein the insurance claim includes pre-determined future check-in dates, and the artificial intelligence resource is further configured to:
- receive notification that a check-in date is reached;
- update the status of the claim at the check-in date; and
- determine, based on the updated status of the claim, whether an additional action should be performed.

19. The system of claim 18, wherein the backend system is configured to:
- determine that no additional action is required; and
- based on determining that no additional action is required, provide a reminder to a client device.

20. The system of claim 1, wherein the artificial intelligence resource is further configured to:
- receive notification that an event associated with the insurance claim has occurred;
- update the status of the claim based on the event; and
- determine, based on the updated status, whether an additional action should be performed.

* * * * *